(12) United States Patent
Toki et al.

(10) Patent No.: US 6,235,260 B1
(45) Date of Patent: May 22, 2001

(54) METHOD FOR PRODUCING $In_2O_3$—$SnO_2$ PRECURSOR SOL

(75) Inventors: Motoyuki Toki; Toshimi Fukui, both of Kyoto; Naoko Asakuma, Otokuni-gun; Takamitsu Fujii, Kameoka, all of (JP)

(73) Assignee: KRI International, Inc., Osaka-fu (JP)

( * ) Notice: Subject to any disclaimer, the term of this patent is extended or adjusted under 35 U.S.C. 154(b) by 0 days.

(21) Appl. No.: 09/230,252

(22) PCT Filed: May 25, 1998

(86) PCT No.: PCT/JP98/02287
§ 371 Date: Mar. 22, 1999
§ 102(e) Date: Mar. 22, 1999

(87) PCT Pub. No.: WO98/54094
PCT Pub. Date: Dec. 3, 1998

(30) Foreign Application Priority Data

| May 26, 1997 | (JP) | 9-153019 |
| Jun. 24, 1997 | (JP) | 9-184523 |
| Jul. 8, 1997 | (JP) | 9-199389 |
| Dec. 24, 1997 | (JP) | 9-368040 |

(51) Int. Cl.$^7$ .................................................. B01F 3/08
(52) U.S. Cl. ........................ 423/593; 516/33; 516/92; 516/88; 106/286.2; 106/286.4
(58) Field of Search ...................... 516/33, 92, 88, 516/FOR 107, FOR 112; 106/286.2, 286.4; 423/593; 427/169, 226, 126.3, 553

(56) References Cited

U.S. PATENT DOCUMENTS 5,728,626 * 3/1998 Allman et al. .
5,843,591 * 12/1998 Oishi et al. .

FOREIGN PATENT DOCUMENTS

| 1-200593 | 8/1989 | (JP) . |
| 8-134382 | 5/1996 | (JP) . |
| 8-253318 | 10/1996 | (JP) . |
| 08339723 * | 12/1996 | (JP) . |

OTHER PUBLICATIONS

"Preparation of Amorphous $Al_2O_3$ Thin Films from Stabilized Al–Alkoxides by the Sol–Gel Method", H. Uchihashi et al., Article 97, 396 (1989) by Japan Ceramics Association, pp. 396–399.

"Dip–coating of $TiO_2$ films using a sol derived from $Ti(O-i-Pr)_4$–diethanolamine–$H_2O$–i–PrOH system", Y. Takahashi et al., Article 23, 2259 (1988) by Journal of Materials Science, pp. 2259–2266.

"Preparation and Some Properties of Organic–Inorganic Gels in the Tetraethylorthosilicate–Polyethylene Glycol System", R. Ota et al., Article 97, 213 (1989) by Japan Ceramics Association, pp. 213–218.

"Dip Coating of Zirconia and Mixed Zirconia Films", Y. Takahashi et al., Article 95, 942 (1987) by Ceramic Industry Association, pp. 942–948.

"Modified Sol–Gel Process for the Production of Lead Titanate Films", S. J. Milne et al., Article 74, 1407 (1991) by Journal of American Ceramics Society, pp. 1407–1410.

"Dip coating of PT, PZ and PZT films using an alkoxide–diethanolamine method" Y. Takahashi et al., Article 25, 3960 (1990) by Journal of Materials Science Association, pp. 3960–3964.

"Oxide Layers Deposited from Organic Solutions", H. Schroeder, Physics of Tin Film, 5 (1969), pp. 87–141.

"Preparation of ITO Thin Films by Sol–Gel Method", T. Furusaki et al., Article 102, 200 (1994) by Japan Ceramics Association, pp. 200–205.

* cited by examiner

Primary Examiner—Steven P. Griffin
Assistant Examiner—Christina Ildebrando
(74) Attorney, Agent, or Firm—McDermott, Will & Emery (57) ABSTRACT

The invention relates to a method for forming a transparent conductive thin film of $In_2O_3$—$SnO_2$ on a surface of a plastics substrate of less heat resistance other than that of glass, ceramics, etc. When an $In_2O_3$—$SnO_2$ precursor sol is produced by hydrolyzing and polymerizing a solution containing indium alkoxide and tin alkoxide, either tri-s-butoxyindium or tri-t-butoxyindium is used as the indium alkoxide. Water is added to the solution containing indium alkoxide and tin alkoxide at a temperature of not higher than −20° C. The obtained $In_2O_3$—$SnO_2$ precursor sol is applied to a surface of a substrate to form a gel film, then the gel film is either irradiated with an ultraviolet beam of which wave length is not longer than 360 nm, or irradiated with an ultraviolet beam of which wave length is not longer than 260 nm and further irradiated with a laser beam of which wave length is not longer than 360 nm, to crystallize the gel forming the thin film, whereby an $In_2O_3$—$SnO_2$ thin film having a conductivity is formed on the surface of the substrate.

3 Claims, 6 Drawing Sheets

METHOD FOR PRODUCING $In_2O_3$—$SnO_2$ PRECURSOR SOL

TECHNICAL FIELD

The present invention relates to a method for producing an $In_2O_3$—$SnO_2$ precursor sol used for forming a transparent conductive thin film of indium oxide-tin oxide $In_2O_3$—$SnO_2$ (ITO) on a surface of a substrate of glass, ceramics, plastics, etc., and to a method for producing $In_2O_3$—$SnO_2$ thin film.

BACKGROUND ART

To form a thin film of a metal oxide on a substrate utilizing a sol-gel method, a metallic alkoxide is used as a raw material, and a precursor sol of the metal oxide is prepared by hydrolyzing and polymerizing the metallicalkoxide. The sol thus obtained is then applied to the surface of the substrate, and after forming a gel of the metal oxide on the surface of the substrate, a film of the gel is subject to a heat treatment at an appropriate temperature. At the time of forming an $In_2O_3$—$SnO_2$ thin film on the surface of the substrate utilizing a sol-gel method, indium alkoxide and tin alkoxide are used as starter material.

Generally, as the hydrolysis of the metallic alkoxide such as indium alkoxide, tin alkoxide, etc. takes place very quickly, it is difficult to prepare a homogeneous sol capable of achieving a homogeneous film formation. To cope with this, there is a method in which concentration of metallic alkoxide is extremely reduced to restrain the speed of hydrolysis of the metallic alkoxide. By employing such a method, it is certainly possible to achieve a film formation of homogeneous sol. However, in such a method, thickness of the thin film obtained by one film formation process becomes extremely small, and this method is not suited for practical use.

As mentioned above, when concentration of the metallic alkoxide is high, it is difficult to prepare any homogeneous sol from which a homogeneous film can be formed. On the other hand, when concentration of the metallic alkoxide is reduced to make it possible to form a homogeneous film, thickness of the thin film obtained by one film formation process is excessively small, which is not suited for practical use. Moreover, generally, the sol obtained by hydrolyzing the metallic alkoxide is unstable such that change in viscosity may occur, precipitate may be produced, or gelation takes place, due to storage for a long time. These problems occur in the same manner at the time of forming the $In_2O_3$—$SnO_2$ thin film utilizing a sol-gel method in which indium alkoxide and tin alkoxide are used as starter material.

As a further method for obtaining a sol from which a film is formed while increasing the concentration of metallic alkoxide and restraining the speed of hydrolysis, several attempts for stabilizing the metallic alkoxide by adding some organic compound capable of being multidentate have been heretofore proposed. For example, it was reported that in the formation of an alumina thin film using aluminum-s-butoxide as a starter material, β-diketone is effective (Article 97,396(1989) by Japan Ceramics Association), and that in the formation of a titania thin film using titanisopropoxide as a starter material, 1,3-butanediol is effective (Article by Dr. Hisao Koshiba of Toyohashi Technological and Scientific College, March, 1993), diethanol amine is effective (Article 23, 2259 (1988) by Journal of Materials Science), and β-diketone is effective (Article 97,213(1989) by Japan Ceramics Association) It is also reported that in the formation of a zirconia thin film using zirconium-n-butoxide as a starter material, employment of diethylene glycol is effective (Article 95,942(1987) by Ceramic Industry Association). Further, it was reported in the Articles 74,1407 (1991) by Journal of American Ceramics Society and 25, 3960 (1990) by Journal of Materials Science that employment of β-diketone and alkanol amine is effective in the composition of a composite oxide such as $PbTiO_3$ and $Pb(Zr, Ti)O_3$.

In the Physics of Tin Film, 5, p87(1969) and in the Academic Press, a method for producing an oxide film utilizing hydrolysis of various inorganic salts such as chloride, sulfate, nitride, ammonium salt and aqua-complex was reported. Further, it was disclosed in the Article 102, 200(1994) by Japan Ceramics Association that, to prepare $In_2O_3$—$SnO_2$ sol being a composite oxide, indium nitrate and tin chloride are used instead of metallic alkoxide.

However, in the method for restraining the speed of hydrolysis of the metallic alkoxide by stabilizing the metallic alkoxide such as indium alkoxide, tin alkoxide, etc. by adding some multidentate compound, it is certainly possible to prepare easily a homogeneous sol suited for film formation, but a lot of organic substances of high boiling point difficult to be decomposed at a high temperature exist in the sol or gel film. As a result, to remove such organic substances, it is necessary for the gel film to be heat-treated at a high temperature of about 500° C. Further, since a lot of organic substances exist in the gel film, when heat-treating the gel film, reduction in weight of the film is large. In other words, a large number of pores are produced as the result of removing the organic substances from the gel film, which eventually results in any defect of the obtained thin film of metal oxide such as $In_2O_3$—$SnO_2$. Moreover, to remove the pores in the film, an additional energy is required for elaboration of the thin film and, therefore, to obtain an $In_2O_3$—$SnO_2$ thin film having desired characteristics, a burning at a temperature of not lower than 600° C. is usually required.

Furthermore, any of the mentioned methods utilizing a metallic salt is essentially a thermal decomposition method, and therefore a lot of problems may occur in the aspect of film quality after the heat treatment.

DISCLOSURE OF THE INVENTION

The present Invention was made in view of the above-discussed problems and has an object of providing a method for producing an $In_2O_3$—$SnO_2$ precursor sol capable of being highly concentrated, preferable in formation of a film, and superior in stability. Another object of the invention is, by using such a precursor sol, to provide a method for producing an $In_2O_3$—$SnO_2$ thin film capable of crystallizing $In_2O_3$—$SnO_2$ at a low temperature and having a characteristic superior in low resistance value (high conductivity), and which method enables a thin film to be formed on a substrate of low heat resistance such as plastics.

In order to accomplish the foregoing objects, the first invention provides a method for producing an $In_2O_3$—$SnO_2$ precursor sol by hydrolyzing and polymerizing a solution containing indium alkoxide and tin alkoxide, characterized in that either tri-s-butoxyindium or tri-t-butoxyindium is used as said indium alkoxide.

In this respect, as the indium alkoxide and tin alkoxide both serving as starter material for preparing the $In_2O_3$—$SnO_2$ precursor sol are strongly associated with each other, characteristics of the obtained precursor sol are different depending upon the combination of compounds. In case of the production method according to the first invention of the mentioned composition, among the starter materials, either tri-s-butoxyindium or tri-t-butoxyindium is used as the indium alkoxide, and these indium alkoxides respectively have an alkoxyl group of large steric hindrance, and their degree of association is small. Accordingly, formation of complex salt between tri-s-butoxyindium or tri-t-butoxyindium and tin alkoxide proceeds easily. As a result, it becomes possible to obtain an $In_2O_3$—$SnO_2$ precursor sol which is stable without occurrence of any change in viscosity, formation of precipitate and gelation in spite of storage for a long time, superior in wettability, capable of being formed into a homogeneous film in the air, and capable of being concentrated such that concentration by 2 weight percent or more is achieved in terms of concentration of oxide while keeping the mentioned stability and film formation characteristic.

Accordingly, in the production method according to the first invention, it is possible to prepare an $In_2O_3$—$SnO_2$ precursor sol of high concentration which is superior in stability and film formation characteristic, and by using this precursor sol, it is further possible to obtain a homogeneous $In_2O_3$—$SnO_2$ thin film having a desired thickness.

In the production method of above composition according to the first invention, it is possible to use either one butoxytin as the tin alkoxide serving as a starter material and which is selected from the group consisting of tetra-n-butoxytin, tetra-s-butoxytin and tetra-t-butoxytin, or two or more of them combined with each other. In this case, it is possible to obtain an $In_2O_3$—$SnO_2$ precursor sol capable of being more highly concentrated, which is superior in stability and film formation characteristic.

In the production method of above composition according to the first invention, it is possible that acid amide of 5 weight % or more in concentration is included in the solution containing indium alkoxide and tin alkoxide. In this case, the alkoxide is stabilized by coordination of small acid amide in the alkoxide, and as a result of this, a homogeneous $In_2O_3$—$SnO_2$ precursor sol is obtained, and with its film formation characteristic improved, an $In_2O_3$—$SnO_2$ precursor sol from which a more homogeneous film is formed can be obtained.

In order to accomplish the foregoing objects, the second invention provides a method for producing an $In_2O_3$—$SnO_2$ precursor sol by hydrolyzing and polymerizing a solution containing indium alkoxide and tin alkoxide, characterized in that water is added to the solution containing indium alkoxide and tin alkoxide at a temperature of not higher than $-20°$ C.

In the production method of above composition according to the second invention, by performing the addition of water to the solution containing indium alkoxide and tin alkoxide at a temperature of not higher than $-20°$ C., speed of the hydrolysis and polymerization of indium alkoxide and tin alkoxide is restrained, and therefore a homogeneous $In_2O_3$—$SnO_2$ precursor sol from which a homogeneous film is formed can be obtained.

Accordingly, in the production method according to the second invention, it is possible to prepare a homogeneous $In_2O_3$—$SnO_2$ precursor sol of high concentration from which a homogeneous film of high concentration can be formed and in which amount of organic substance remains less in the gel film after the film formation. The precursor sol thus obtained is optimum for the formation of $In_2O_3$—$SnO_2$ thin film, and it becomes possible to obtain an $In_2O_3$—$SnO_2$ thin film of high quality from this precursor sol.

In the production method of above composition according to the second invention, it is possible to hydrolyze and polymerize the solution containing indium alkoxide and tin alkoxide without using any multidentate compound. In this manner, as a result of not using any multidentate compound, when a film has been formed using the $In_2O_3$—$SnO_2$ precursor sol, amount of organic substance remains less in the gel film.

In the production method of above composition according to the second invention, it is preferable that the addition of water to the solution containing indium alkoxide and tin alkoxide is performed within the temperature range of $-50°$ C. to $-80°$ C.

The third invention provides a production method characterized in that the $In_2O_3$—$SnO_2$ precursor sol obtained by the production method according to the mentioned first or second invention is applied to a surface of a substrate, a thin film of $In_2O_3$—$SnO_2$ gel capable of being crystallized by heat treatment at a temperature of not higher than $300°$ C. is formed on the surface of the substrate, then the thin film is irradiated with an ultraviolet beam of which wave length is not longer than 360 nm to crystallize the $In_2O_3$—$SnO_2$ gel forming the thin film, whereby an $In_2O_3$—$SnO_2$ thin film having a conductivity is formed on the surface of the substrate.

In the production method of above composition according to the third invention, by applying the $In_2O_3$—$SnO_2$ precursor sol obtained by the production method according to the mentioned first or second invention to a surface of a substrate to form a thin film of $In_2O_3$—$SnO_2$ gel capable of being crystallized by heat treatment at a temperature of not higher than $300°$ C. on the surface of the substrate, and by irradiating the thin film with an ultraviolet beam of which wave length is not longer than 360 nm, the $In_2O_3$—$SnO_2$ gel is crystallized, whereby a conductivity is given to the $In_2O_3$—$SnO_2$ thin film. At this time, the thin film of $In_2O_3$—$SnO_2$ gel formed on the surface of the substrate can be crystallized by the heat treatment at a temperature of not higher than $300°$ C. Accordingly, to crystallize the $In_2O_3$—$SnO_2$ gel, it is no more necessary to perform a heat treatment at a high temperature of $500°$ C. as is required in the prior arts, and therefore it becomes possible to form an $In_2O_3$—$SnO_2$ thin film on any substrate of low heat resistance such as plastics. In addition, mechanism of the crystallization of the $In_2O_3$—$SnO_2$ gel by the irradiation with ultraviolet beam is not always clear, but it is presumed that the thin film absorbs the ultraviolet beam, and rearrangement of atoms takes place by the energy thereof, eventually resulting in the crystallization of the $In_2O_3$—$SnO_2$ gel. Accordingly, in the production method according to the third invention, a transparent conductive thin film of $In_2O_3$—$SnO_2$ can be formed also on the substrate of low heat resistance such as plastics.

The fourth invention provides a production method characterized in that the $In_2O_3$—$SnO_2$ precursor sol obtained by the production method according to the mentioned first or second invention is applied to a surface of a substrate, a thin film of $In_2O_3$—$SnO_2$ gel capable of being crystallized by heat treatment at a temperature of not higher than $300°$ C. is formed on the surface of the substrate, then the thin film is irradiated with an ultraviolet beam of which wave length is not longer than 260 nm to form a gel film in which fine grains of metallic indium and/or metallic tin are dispersed, and the gel film is further irradiated with a laser beam of which wave length is not longer than 360 nm to crystallize the gel forming the thin film, whereby an $In_2O_3$—$SnO_2$ thin film having a conductivity is formed on the surface of the substrate.

In the production method of above composition according to the fourth invention, by applying the $In_2O_3$—$SnO_2$ precursor sol obtained by the production method according to the mentioned first or second invention to a surface of a substrate to form a thin film of $In_2O_3$—$SnO_2$ gel, and by irradiating the thin film with an ultraviolet beam of which wave length is not longer than 360 nm, a gel film in which fine grains of metallic indium and/or metallic tin are dispersed can be obtained. At this time, the thin film of $In_2O_3$—$SnO_2$ gel formed on the surface of the substrate can be crystallized by the heat treatment at a temperature of not higher than 300° C. Mechanism of the formation of the metallic indium or metallic tin is not always clear, but it is presumed that by irradiating the thin film of $In_2O_3$—$SnO_2$ gel with the ultraviolet beam of which wave length is not longer than 260 nm, cleavage of the combination M—O (metal-oxygen) in the metal oxide proceeds, whereby a reduction proceeds. At the same time, the combination O—C (oxygen-carbon) of the organic substance remaining in the thin film of $In_2O_3$—$SnO_2$ gel is also cut off. As a result of this, it becomes possible to obtain a gel film in which amount of residual organic substance is less and fine grains of metallic indium and/or metallic tin are dispersed.

Then, when the laser beam of which wave length is not longer than 360 nm is absorbed by the gel film in which fine grains of metallic indium and/or metallic tin are dispersed, indium and/or tin in the gel film are again oxidated, whereby the gel film is crystallized. In this case, if grain size of the fine grains of the metallic indium and/or metallic tin dispersed in the gel film is larger than 100 nm, the metal is left in the thin film after the irradiation of the gel film with laser beam, and transmittance of the $In_2O_3$—$SnO_2$ thin film is lowered. On the other hand, if grain size of the fine grains of the metallic indium and/or metallic tin dispersed in the gel film is not larger than 100 nm, an $In_2O_3$—$SnO_2$ thin film of high transparency can be obtained.

Accordingly, in the production method according to the fourth invention, the transparent conductive $In_2O_3$—$SnO_2$ thin film can be obtained without performing any heat treatment, and an $In_2O_3$—$SnO_2$ thin film having a conductivity can be formed on the substrate of low heat resistance such as plastics. Further, the fourth invention is also applicable to the patterning of $In_2O_3$—$SnO_2$ without step as described later.

BEST MODE FOR CARRYING OUT THE INVENTION

In the production method of the $In_2O_3$—$SnO_2$ precursor sol according to each of the first and second inventions, indium alkoxide and tin alkoxide are used as starter materials, and a solution containing these starter materials are hydrolyzed and polymerized.

In this respect, as a result of repeating various discussions and studies to obtain an $In_2O_3$—$SnO_2$ precursor sol which is capable of being highly concentrated and superior in stability and film formation characteristic, it was found that the $In_2O_3$—$SnO_2$ precursor sol having required characteristics could be obtained by hydrolyzing the solution containing indium alkoxide and tin alkoxide employing either tri-s-butoxyindium or tri-t-butoxyindiumas the indium alkoxide. Thus, the method according to the first invention is characterized in that either tri-s-butoxyindium or tri-t-butoxyindium is used as the indium alkoxide.

As the tin alkoxide, tin propoxide, tin butoxide and tin bentoxide are used, and among which tin butoxide is most suitably used. In particular, when using one tin alkoxide among the tetra-n-butoxytin, tetra-s-butoxytin and tetra-t-butoxytin or using two of them, it is possible to prepared an $In_2O_3$—$SnO_2$ precursor sol which is capable of being highly concentrated and superior in stability and film formation characteristic.

Solvent used in the preparation of the $In_2O_3$—$SnO_2$ precursor sol is not particularly defined as far as a reaction product between the mentioned alkoxide and indium alkoxide and the tin alkoxide is soluble, and alcohol, hydrocarbon, aromatic, tetrahydroxyfuran (THF), dioxane, organic acid ester such as methyl acetate, ethyl acetate, acetonitrile, acetone, ketone such as ethyl methyl ketone can be used.

It is preferable that acid amide (RCONR'R": R, R' and R" are alkyl groups) is included in the solution containing alkoxide . It is preferable that the acid amide is included at a concentration of not less than 5 weight %. As the acid amide, formamide (FA), acetoamide, N-methylformamide, N,N-dimethylformamide, n,n-diethylformamide and N,N-dimethylacetoamide, etc. are used. By including acid amide in the solution containing alkoxide, the high concentration, stability and film formation characteristic of the sol are improved. It is also preferable that β-diketone (RCOCH2COR': R and R' are alkyl groups or alkoxyl groups) is included in the solution containing alkoxide. It is preferable that the β-diketone is included in the amount of 0.1 mol to 0.5 mol time as much as the indium alkoxide and tin alkoxide. As the β-diketone, acetyl acetone, acetoacetic ester such as ethyl acetoacetate (etac), methyl acetoacetate (meac), malonic ester such as diethyl malonate are used. By including β-diketone in the solution containing alkoxide, the β-diketone forms a substitution product of alkoxyl group of the alkoxide, and the alkoxide is stabilized, whereby the film formation characteristic of the sol is further improved and more homogeneous film can be formed.

In the hydrolysis of the solution containing alkoxide, a water of 0.5 mol to 2 mol times as much as alkoxide is used and, more preferably, a water of 0.5 mol to 1.5 mol times is used. In this hydrolysis, acid catalyst and/or base catalyst may be used and, preferably, mineral acid such as hydrochloric acid and organic acid such as acetic acid are used.

The method for producing an $In_2O_3$—$SnO_2$ precursor sol is characterized in that indium alkoxide and tin alkoxide are hydrolyzed and polymerized by adding water to a solution containing the indium alkoxide and tin alkoxide at a temperature of not higher than −20° C.

In the method according to the second invention, the indium alkoxide and tin alkoxide to be used are not particularly defined, but from the viewpoint of concentration of oxide contained, easy elimination of organic substance, easy procurement or availability, etc., it is preferable to use those of which carbon number of alkoxyl group is 1 to 4. For example, as the indium alkoxide, indium methoxide, indium ethoxide, indium propoxide and indium butoxide are used, and among which tri-i-propoxyindium, tri-s-butoxyindium, tri-t-butoxyindium, etc. are preferably used. As the tin alkoxide, tin methoxide, tin ethoxide, tin propoxide and tin butoxide are used, and among which tetra-i-propoxytin, tetra-n-butoxytin, tetra-s-butoxytin, tetra-t-butoxytin, etc. are preferably used. One of the mentioned indium alkoxides or tin alkoxides may be singly used, or two or more of them may be used in combination with each other. Ratio of content of indium alkoxide and tin alkoxide is not particularly defined, but it is preferable to select a ratio in which 1 weight % to 20 weight % of $SnO_2$ is included in $In_2O_3$—$SnO_2$ in order to obtain an $In_2O_3$—$SnO_2$ conductive film of lower resistance.

Temperature of adding water to the solution containing indium alkoxide and tin alkoxide depends on the stability of those alkoxide, and the temperature may be $-20°$ C., and depending on the type of indium alkoxide and tin alkoxide, the it is preferable that addition is performed in the temperature range of $-50°$ C. to $-80°$ C. By performing the addition of water at a low temperature of $-20°$ C., it is possible for the indium alkoxide and tin alkoxide to perform a hydrolysis and polymerization reaction at a high concentration without stabilizing the alkoxide by adding any multidentate compound to the indium alkoxide and tin alkoxide, and therefore an $In_2O_3$—$SnO_2$ precursor sol of high concentration not containing any unnecessary organic substance such as multidentate compound can be obtained. As a result, when using such an $In_2O_3$—$SnO_2$ precursor sol, a gel film containing less organic substance is easily obtained, and when the organic substance is eliminated from the gel through heat treatment or the like, destruction of fine organization and number of residual pores can be reduced in the obtained thin film.

Solvent to be used may be a single solvent or a mixed solvent and is not particularly defined as far as raw material of alkoxide and water used in the hydrolysis are soluble. For example, it is no problem to combine a polar solvent with an inactive solvent. From the view points of viscosity, easy removal, etc. in the temperature range for adding water, methanol, ethanol and propanol being an alcohol of which carbon number is 1 to 3 are preferably used.

To make easy the elimination of the solvent after the gelation, it is preferable that amount of use of the multidentate compound directly combined with alkoxide is restrained as much as possible. Instead, in the method according to the second invention, it is possible to prepare the $In_2O_3$—$SnO_2$ precursor sol without using any multidentate compound. On the other hand, acid amide or the like represented by RCONR' (R, R' are hydrogen or alkyl group) having a plurality of functional groups capable of being coordinated does not form a combination with alkoxyl group by substitution, and does not solidify at the temperature of addition of water, which means that the acid amide or the like can be easily removed by volatilization and therefore can be used without problem.

Amount of addition of water is different depending on the type of the alkoxyl group in the indium alkoxide and tin alkoxide and on the mixing ratio between indium alkoxide and tin alkoxide, and therefore cannot be specified. Further, depending on the type of alkoxyl group and on the mixing ratio between indium alkoxide and tin alkoxide, the optimum stable pH value of sol is different, and therefore any acid or base is appropriately used as a catalyst. The catalyst to be used is not particularly defined, but to obtain a material of high purity, it is preferable to use a compound not containing metallic component. For example, mineral acid such as hydrochloric acid, nitric acid, sulfuric acid, phosphoric acid, and organic acid such as carbonic acid, boric acid, formic acid, acetic acid, oxalic acid are used as the acid. Ammonia, amine, etc. are used as the base.

Then, in the production method of the $In_2O_3$—$SnO_2$ thin film according to each of the third and fourth inventions, the $In_2O_3$—$SnO_2$ precursor sol obtained by the production method according to the first or second invention is applied to a surface of a substrate, and after drying it, a thin film of $In_2O_3$—$SnO_2$ gel capable of being crystallized by the heat treatment at a temperature of not higher than $300°$ C. is formed on the surface of the substrate. Thereafter, in the method according to the third invention, the thin film of $In_2O_3$—$SnO_2$ gel formed on the surface of the substrate is irradiated with an ultraviolet beam of which wave length is not longer than 360 nm, whereby the $In_2O_3$—$SnO_2$ gel forming the thin film is crystallized, and an $In_2O_3$—$SnO_2$ thin film having a conductivity is formed on the surface of the substrate. In the fourth invention, the thin film of $In_2O_3$—$SnO_2$ gel formed on the surface of the substrate is irradiated with an ultraviolet beam of which wave length is not longer than 260 nm, and a gel film on which fine grains of metallic indium and/or metallic tin are dispersed is formed, then the gel film with metal grains dispersed is irradiated with a laser beam of which wave length is not longer than 360 nm, whereby the $In_2O_3$—$SnO_2$ gel forming the thin film is crystallized, and an $In_2O_3$—$SnO_2$ thin film having a conductivity is formed on the surface of the substrate.

The process for applying the $In_2O_3$—$SnO_2$ precursor sol to the surface of the substrate is not particularly defined, and dip coating, spin coating, flow coating, spray coating, etc. usually employed are used. The thin film of $In_2O_3$—$SnO_2$ gel formed on the surface of the substrate at this time can be crystallized at the time of the heat treatment by the temperature of not higher than $300°$ C.

When the thin film of $In_2O_3$—$SnO_2$ gel is formed on the surface of the substrate, in the method according to the third invention, the thin film is irradiated with an ultraviolet beam of which wave length is not longer than 360 nm. As the light source of the ultraviolet beam, high pressure mercury lamp, low pressure mercury lamp, excimer lamp, ArF excimer laser, KrF excimer laser, KrCl excimer laser, XeF excimer laser, synchrotron radiation beam, etc. are used and, more preferably, low pressure mercury lamp, excimer lamp, ArF excimer laser, KrF excimer laser or synchrotron radiation beam of which peak wave length is shorter is used. It is also possible to use two or more of these light sources in combination. Thus, as a result of irradiating the thin film of $In_2O_3$—$SnO_2$ gel, the $In_2O_3$—$SnO_2$ gel forming the thin film is crystallized, thereby a conductivity being given to the thin film, and a transparent conductive $In_2O_3$—$SnO_2$ thin film is formed on the surface of the substrate.

Further, when the thin film of $In_2O_3$—$SnO_2$ gel is formed on the surface of the substrate, in the method according to the fourth invention, the thin film is irradiated with an ultraviolet beam of which wave length is not longer than 260 nm. As the light source of the ultraviolet beam, low pressure mercury lamp, excimer lamp, etc. are used. As a result of irradiating the thin film of $In_2O_3$—$SnO_2$ gel with the ultraviolet beam of which wave length is not longer than 260 nm, a gel film with metallic indium and/or metallic tin dispersed is obtained.

Length of beam irradiation is appropriately decided depending on the type of liquid applied, ratio between indium and tin, thickness of the thin film of $In_2O_3$—$SnO_2$ gel, etc., and to obtain the $In_2O_3$—$SnO_2$ thin film, it is preferable that transmittance of the metal dispersed gel film after the irradiation is not lower than 20%. If the transmittance of the gel film after the irradiation is lower than 20%, any metal remains after the irradiation of the metal dispersed gel film with a laser beam in the next process, and the transmittance of the $In_2O_3$—$SnO_2$ thin film is lowered. Therefore, it is more preferable that the transmittance of the metal dispersed gel film after the irradiation is in the range of 30% to 60%.

When the metal dispersed gel film is formed on the surface of the substrate, the gel film is irradiated with a laser beam. In this process, a light source for irradiation of a light of which wave length is not longer than 360 nm is used. As the light source, ArF laser (193 nm), KrF laser (249 nm), triple wave (353 nm) and quadruple wave (266 nm) of YAG laser, etc. are used. It is also possible to use two or more of these light sources in combination. Thus, as a result of irradiating the metal dispersed gel film with the laser beam, indium and/or tin in the gel film are again oxidized, the gel film is crystallized, whereby a transparent conductive thin film is formed on the surface of the substrate.

Described hereinafter are examples to which the invention is specifically applied.

<Preparation of the $In_2O_3$—$SnO_2$ gel>

EXAMPLES 1 TO 26

By hydrolyzing a solution containing indium alkoxide and tin alkoxide at a predetermined ratio so that concentration of solid $In_2O_3$ and $SnO_2$ are 5 weight %, an $In_2O_3$—$SnO_2$ precursor sol was obtained. Type of indium alkoxide and tin alkoxide, ratio of indium In and tin Sn ($SnO_2$ weight %), type of solvent, and amount of water used in the hydrolysis are shown in Tables 1 and 2, together with those of Comparative Examples 1 to 3 described later. In Tables 1 and 2, "amount" of acid amide is shown in weight %, and "amount" of β-diketone is shown in mol ratio to (In+Sn) "Amount of addition" of "water" is shown in mol ratio of $H_2O$/(In+Sn), and "pH" of "water" was adjusted by hydrochloric acid (HCl)

TABLE 1

| | Raw material | | | Solvent | | | | Water | |
|---|---|---|---|---|---|---|---|---|---|
| | In-alkoxide | Sn-alkoxide | SnO2 weight % | Acid amide | Amount | β-diketone | Amount | Amount of addition | pH |
| Example | | | | | | | | | |
| 1 | In(O-t-C4H9)3 | Sn(O-n-C4H9)4 | 10 | DMF | 50 | acac | 0.5 | 1 | 1 |
| 2 | In(O-t-C4H9)3 | Sn(O-s-C4H9)4 | 10 | DMF | 50 | acac | 0.5 | 1 | 1 |
| 3 | In(O-t-C4H9)3 | Sn(O-t-C4H9)4 | 10 | DMF | 50 | acac | 0.5 | 1 | 1 |
| 4 | In(O-t-C4H9)3 | Sn(O-s-C4H9)4 | 2 | DMF | 50 | acac | 0.5 | 1 | 1 |
| 5 | In(O-t-C4H9)3 | Sn(O-s-C4H9)4 | 5 | DMF | 50 | acac | 0.5 | 1 | 1 |
| 6 | In(O-t-C4H9)3 | Sn(O-s-C4H9)4 | 15 | DMF | 50 | acac | 0.5 | 1 | 1 |
| 7 | In(O-t-C4H9)3 | Sn(O-s-C4H9)4 | 20 | DMF | 50 | acac | 0.5 | 1 | 1 |
| 8 | In(O-s-C4H9)3 | Sn(O-s-C4H9)4 | 10 | DMF | 50 | acac | 0.5 | 1 | 1 |
| 9 | In(O-t-C4H9)3 | Sn(O-s-C4H9)4 | 10 | DMF | 5 | acac | 0.5 | 1 | 1 |
| 10 | In(O-t-C4H9)3 | Sn(O-s-C4H9)4 | 10 | DMF | 20 | acac | 0.5 | 1 | 1 |
| 11 | In(O-t-C4H9)3 | Sn(O-s-C4H9)4 | 10 | DMF | 90 | acac | 0.5 | 1 | 1 |
| 12 | In(O-s-C4H9)3 | Sn(O-s-C4H9)4 | 10 | DMF | 50 | acac | 0.1 | 1 | 1 |
| 13 | In(O-s-C4H9)3 | Sn(O-s-C4H9)4 | 10 | DMF | 50 | acac | 0.8 | 1 | 1 |
| 14 | In(O-s-C4H9)3 | Sn(O-s-C4H9)4 | 10 | DMF | 50 | acac | 1 | 1 | 1 |
| 15 | In(O-s-C4H9)3 | Sn(O-s-C4H9)4 | 10 | DMF | 50 | acac | 1.5 | 1 | 1 |
| 16 | In(O-t-C4H9)3 | Sn(O-n-C4H9)4 | 2 | DMF | 50 | acac | 0.5 | 1 | 1 |
| 17 | In(O-t-C4H9)3 | Sn(O-n-C4H9)4 | 5 | DMF | 50 | acac | 0.5 | 1 | 1 |

TABLE 2

| | Raw Material | | | Solvent | | | | Water | |
|---|---|---|---|---|---|---|---|---|---|
| | In-alkoxide | Sn-alkoxide | SnO2 weight % | Acid amide | Amount | β-diketone | Amount | Amount of addition | pH |
| 18 | In(O-t-C4H9)3 | Sn(O-n-C4H9)4 | 15 | DMF | 50 | acac | 0.5 | 1 | 1 |
| 19 | In(O-t-C4H9)3 | Sn(O-n-C4H9)4 | 20 | DMF | 50 | acac | 0.5 | 1 | 1 |
| 20 | In(O-t-C4H9)3 | Sn(O-s-C4H9)4 | 10 | DMF | 50 | acac | 0.5 | 1 | 3 |
| 21 | In(O-t-C4H9)3 | Sn(O-s-C4H9)4 | 10 | DMF | 50 | acac | 0.5 | 1 | 5 |
| 22 | In(O-t-C4H9)3 | Sn(O-s-C4H9)4 | 10 | DMF | 50 | acac | 0.5 | 0.5 | 1 |
| 23 | In(O-t-C4H9)3 | Sn(O-s-C4H9)4 | 10 | DMF | 50 | acac | 0.5 | 1.5 | 1 |
| 24 | In(O-t-C4H9)3 | Sn(O-s-C4H9)4 | 10 | DMF | 50 | meac | 0.5 | 1 | 1 |
| 25 | In(O-t-C4H9)3 | Sn(O-s-C4H9)4 | 10 | DMF | 50 | etac | 0.5 | 1 | 1 |
| 26 | In(O-t-C4H9)3 | Sn(O-s-C4H9)4 | 10 | HA | 50 | acac | 0.5 | 1 | 1 |

TABLE 2-continued

| | Raw Material | | | Solvent | | | | Water | |
| --- | --- | --- | --- | --- | --- | --- | --- | --- | --- |
| | In-alkoxide | Sn-alkoxide | SnO2 weight % | Acid amide | Amount | β-diketone | Amount | Amount of addition | pH |
| Comparative Example 1 | In(O-n-C3H5)3 | Sn(O-s-C4H9)4 | 10 | DMF | 50 | acac | 0.5 | 1 | 1 |
| 2 | In(O-s-C4H9)3 | Sn(O-s-C4H9)4 | 10 | DMF | 0 | acac | 0.5 | 1 | 1 |
| 3 | In(O-s-C4H9)3 | Sn(O-s-C4H9)4 | 10 | DMF | 50 | acac | 0 | 1 | 1 |

Then, after dip coating the obtained $In_2O_3$—$SnO_2$ precursor sol on a silica glass substrate, an $In_2O_3$—$SnO_2$ gel was crystallized by burning a thin film of $In_2O_3$—$SnO_2$ gel at a predetermined temperature for one hour. Condition of the $In_2O_3$—$SnO_2$ precursor sol obtained in the foregoing examples, condition of the thin film of $In_2O_3$—$SnO_2$ gel after dip coating on the silica glass substrate, and crystallizing temperature of the $In_2O_3$—$SnO_2$ gel are shown in Table 3 together with the results of Comparative Examples 1 to 3 described later. In Table 3, "○" in the column of "condition of sol" shows that a transparent homogeneous sol was prepared. "○" in the column of "condition of film" shows that a transparent homogeneous film was prepared, and "×" shows that any film was not formed.

TABLE 3

| | Condition of Sol | Condition of Film | Crystallization Temperature (° C.) |
| --- | --- | --- | --- |
| Example | | | |
| 1 | ○ | ○ | 270 |
| 2 | ○ | ○ | 270 |
| 3 | ○ | ○ | 270 |
| 4 | ○ | ○ | 250 |
| 5 | ○ | ○ | 260 |
| 6 | ○ | ○ | 280 |
| 7 | ○ | ○ | 300 |
| 8 | ○ | ○ | 270 |
| 9 | ○ | ○ | 260 |
| 10 | ○ | ○ | 260 |
| 11 | ○ | ○ | 280 |
| 12 | ○ | ○ | 260 |
| 13 | ○ | ○ | 270 |
| 14 | ○ | ○ | 270 |
| 15 | ○ | ○ | 280 |
| 16 | ○ | ○ | 250 |
| 17 | ○ | ○ | 280 |
| 18 | ○ | ○ | 290 |
| 19 | ○ | ○ | 300 |
| 20 | ○ | ○ | 260 |
| 21 | ○ | ○ | 250 |
| 22 | ○ | ○ | 270 |
| 23 | ○ | ○ | 270 |
| 24 | ○ | ○ | 270 |
| 25 | ○ | ○ | 270 |
| 26 | ○ | ○ | 270 |
| Comparative Example | | | |
| 1 | Precipitation | X | 450* |
| 2 | Partial Gelation | X | 400* |
| 3 | Partial Gelation | X | 420* |

Figure 1:
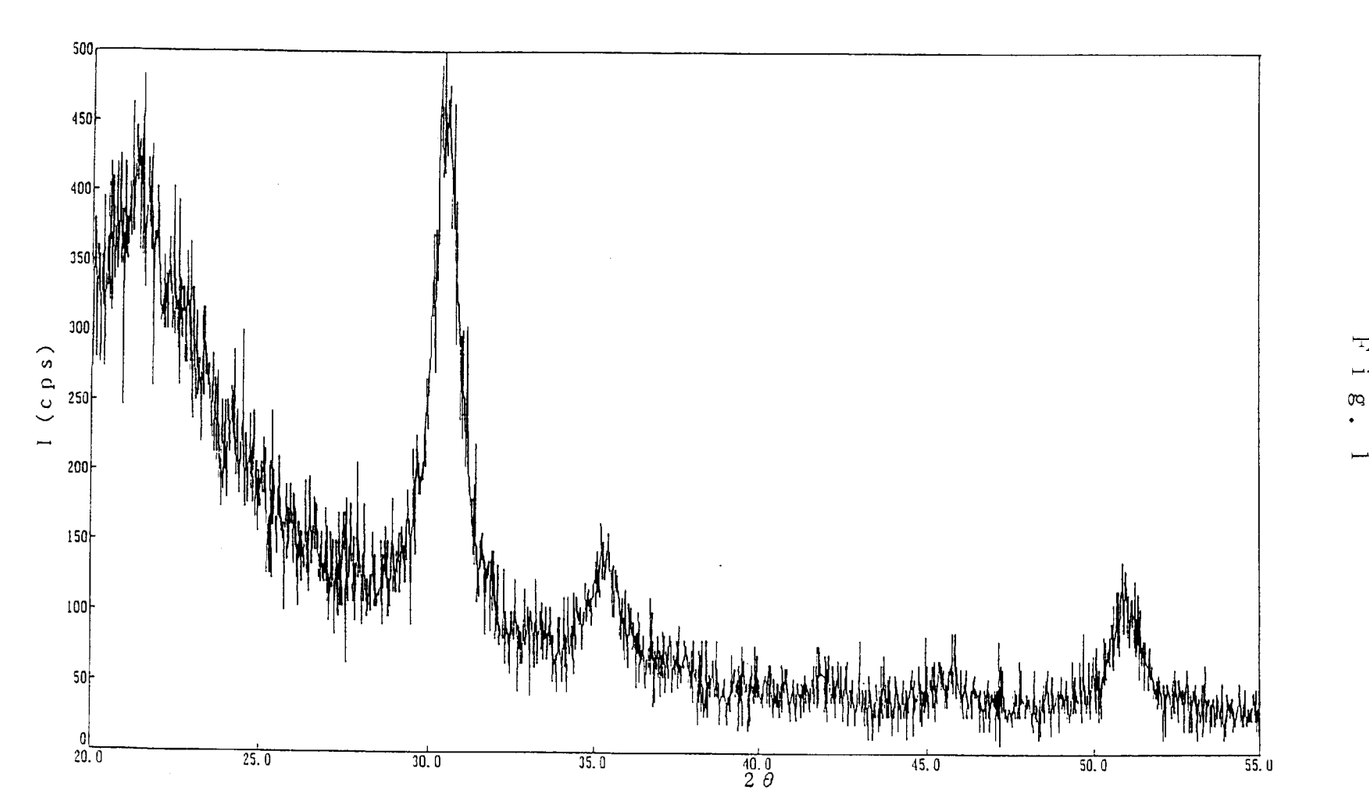
FIG. 1 shows a thin film X ray diffraction pattern of the $In_2O_3$—$SnO_2$ thin film obtained by burning the thin film of $In_2O_3$—$SnO_2$ gel formed on a silica glass substrate at a temperature of 300° C.

As is obviously understood from the results shown in Table 3, a transparent $In_2O_3$—$SnO_2$ precursor sol was obtained in every group of Examples 1 to 26 according to the first invention, and there was no problem at all in the film formation characteristic. A crystal phase of $In_2O_3$—$SnO_2$ was acknowledged at a temperature of 250 to 300° C. There was a tendency that when more tin was added and more DMF was added, the crystallization temperature was higher. Further, as a result of detailed analysis of the crystallization starting temperature in Example 3, a crystal phase was acknowledged by burning at a temperature of 230° C. for 12 hours. FIG. 1 shows a thin film X ray diffraction pattern of the $In_2O_3$—$SnO_2$ thin film obtained by burning the thin film of $In_2O_3$—$SnO_2$ gel formed on a silica glass substrate at a temperature of 300° C. in Example 3.

Comparative Examples 1 to 3

An $In_2O_3$—$SnO_2$ precursor sol was prepared in the composition shown in Table 1. As is understood from the results shown in Table 3, any homogeneous $In_2O_3$—$SnO_2$ precursor sol could not obtained. Crystallization temperature was inspected by drying and heat treating the precipitate and gelated substance, and it was found that the crystallization temperature was so high as to be 400 to 420° C. as compared with the examples according to the first invention.

<Preparation of thin film of $In_2O_3$—$SnO_2$ gel>

EXAMPLES 27 TO 42

Indium alkoxide and tin alkoxide were added to ethanol so that concentration of solid $In_2O_3$ and $SnO_2$ was 15 weight %, thus a mixed solution of indium alkoxide and tin alkoxide was prepared. Then a mixed solution of distilled water-ethanol was prepared so that concentration of solid $In_2O_3$ and $SnO_2$ was 10 weight % when added to the mixed solution of alkoxide. After cooling the mixed solution of alkoxide and the mixed solution of distilled water-ethanol to a predetermined temperature in a refrigerant, the two solutions were mixed and, thereafter, the mixed solution was returned to room temperature, whereby a homogeneous $In_2O_3$—$SnO_2$ precursor sol was obtained. Mixing ratio and composition conditions are shown in Table 4 together with those of Comparative Examples 4 and 5 described later. In Table 4, "Amount of addition" of "water" is shown in mol ratio of $H_2O/(In+Sn)$, and "pH" of "water" was adjusted by hydrochloric acid (HCl). In Table 4, "○" in the column of "condition of film" shows that a transparent homogeneous film was prepared.

TABLE 4

| | Raw Material | | | | Water | | Temperature of | Condition |
|---|---|---|---|---|---|---|---|---|
| | In-alkoxide | Sn-alkoxide | SnO2 weight % | Solvent | Amount of addition | pH | Addition (° C.) | of Sol |
| Example | | | | | | | | |
| 27 | In(O-s-C4H9)3 | Sn(OC2H5)4 | 10 | ethanol | 0.6 | 1 | −75 | ○ |
| 28 | In(O-s-C4H9)3 | Sn(O-n-C3H7)4 | 10 | ethanol | 0.6 | 1 | −75 | ○ |
| 29 | In(O-s-C4H9)3 | Sn(O-i-C3H7)4 | 10 | ethanol | 0.6 | 1 | −75 | ○ |
| 30 | In(O-s-C4H9)3 | Sn(O-n-C4H9)4 | 10 | ethanol | 0.6 | 1 | −75 | ○ |
| 31 | In(O-s-C4H9)3 | Sn(O-s-C4H9)4 | 10 | ethanol | 0.6 | 1 | −75 | ○ |
| 32 | In(O-s-C4H9)3 | Sn(O-t-C4H9)4 | 10 | ethanol | 0.6 | 1 | −75 | ○ |
| 33 | In(O-s-C4H9)3 | Sn(O-s-C4H9)4 | 2 | ethanol | 0.6 | 1 | −75 | ○ |
| 34 | In(O-s-C4H9)3 | Sn(O-s-C4H9)4 | 5 | ethanol | 0.6 | 1 | −75 | ○ |
| 35 | In(O-s-C4H9)3 | Sn(O-s-C4H9)4 | 15 | ethanol | 0.6 | 1 | −75 | ○ |
| 36 | In(O-s-C4H9)3 | Sn(O-s-C4H9)4 | 20 | ethanol | 0.6 | 1 | −75 | ○ |
| 37 | In(O-s-C4H9)3 | Sn(O-s-C4H9)4 | 10 | ethanol | 0.6 | 3 | −75 | ○ |
| 38 | In(O-s-C4H9)3 | Sn(O-s-C4H9)4 | 10 | ethanol | 0.6 | 5 | −75 | ○ |
| 39 | In(O-s-C4H9)3 | Sn(O-s-C4H9)4 | 10 | dimethyl formaldehyde | 0.6 | 1 | −50 | ○ |
| 40 | In(O-s-C4H9)3 | Sn(O-s-C4H9)4 | 10 | ethanol | 0.6 | 1 | −75 | ○ |
| 41 | In(O-i-C3H7)3 | Sn(O-s-C4H9)4 | 10 | ethanol | 0.6 | 1 | −75 | ○ |
| 42 | In(O-i-C3H7)3 | Sn(O-i-C3H7)4 | 10 | ethanol/2-propanol | 0.6 | 1 | −75 | ○ |
| Comparative Example | | | | | | | | |
| 4 | In(O-t-C4H9)3 | Sn(O-s-C4H9)4 | 10 | ethanol | 0.6 | 1 | Room Temperature | Partial Gelation |
| 5 | In(O-t-C4H9)3 | Sn(O-s-C4H9)4 | 10 | 2-butanol | 1 | 1 | Room Temperature | ○ |

Then, the obtained $In_2O_3$—$SnO_2$ precursor sol was diluted so that concentration of oxides of respective $In_2O_3$ and $SnO_2$ was 5 weight %, and the diluted sol was spin coated at a revolution of 1,000 rpm, whereby a film was formed on a silica substrate. Thus, an apparently homogeneous thin film of $In_2O_3$—$SnO_2$ gel was obtained. The obtained thin film was burned at a predetermined temperature for one hour, and the $In_2O_3$—$SnO_2$ gel was crystallized. A transparent $In_2O_3$—$SnO_2$ precursor sol was obtained in every group of Examples 27 to 42 according to the second invention, and there was no problem at all in the film formation characteristic. A crystal phase of $In_2O_3$—$SnO_2$ was acknowledged at a temperature of 250 to 300° C. In the same manner as the foregoing Examples 1 to 26, there was a tendency that when more tin was added and more DMF was added, the crystallization temperature was higher.

Further, film thickness and resistance value of the $In_2O_3$—$SnO_2$ thin film after the heat treatment was measured and evaluated. Film thickness was measured using a step measuring meter. Resistance value was obtained by 4 terminal method (In the measurement, Rolester·MP, MCP-T-350 produced by Mitsubishi Chemical was used). Characteristics of the obtained film was shown in FIG. 5 together with those of Comparative Example 5 described later.

TABLE 5

| Sol | Burning Temperature | Film Thickness (nm) | Sheet Resistance (Ω/□) | Specific Resistance (Ω cm) |
|---|---|---|---|---|
| Example | | | | |
| 27 | 400 | 70 | 3.60E + 03 | 2.52E − 02 |
| 28 | 400 | 75 | 3.20E + 03 | 2.40E − 02 |
| 29 | 400 | 75 | 3.60E + 03 | 2.70E − 02 |
| 30 | 400 | 80 | 3.10E + 03 | 2.48E − 02 |
| 31 | 400 | 85 | 2.50E + 03 | 2.13E − 02 |
| 31 | 500 | 80 | 7.40E + 02 | 5.92E − 03 |
| 32 | 400 | 85 | 2.70E + 03 | 2.30E − 02 |
| 33 | 400 | 85 | 4.80E + 04 | 4.08E − 01 |
| 34 | 400 | 80 | 4.10E + 03 | 3.28E − 02 |
| 35 | 400 | 80 | 2.30E + 03 | 1.84E − 02 |
| 36 | 400 | 75 | 2.80E + 03 | 2.10E − 02 |
| 37 | 400 | 75 | 2.90E + 03 | 2.18E − 02 |
| 38 | 400 | 90 | 2.70E + 03 | 2.43E − 02 |
| 39 | 400 | 65 | 4.10E + 03 | 2.67E − 02 |
| 40 | 400 | 90 | 2.60E + 03 | 2.34E − 02 |
| Comparative Example | | | | |
| 5 | 500 | 40 | 8.30E + 03 | 3.32E − 02 |

Comparative Example 4

Tri-t-butoxyindium and tetra-s-botoxytin were added to ethanol so that concentration of solid $In_2O_3$ and $SnO_2$ was 5 weight %, thus a mixed solution of alkoxide was prepared. Then a mixed solution of IN hydrochloric acid-ethanol (mol ratio of $H_2O/(In+Sn)$ is 0.6) was prepared so that concentration of solid oxide was 2.5 weight % when added to the mixed solution of alkoxide, and this mixed solution was added to the mixed solution of alkoxide at room temperature. Any homogeneous sol could not obtained because of partial opaqueness ad gelation starting from the portion where water (IN hydrochloric acid-ethanol) was added.

Comparative Example 5

Tri-t-butoxyindium and tetra-s-botoxytin were added to 2-butanol so that concentration of solid $In_2O_3$ and $SnO_2$ was 5 weight %, thus a mixed solution of alkoxide was prepared. Then a mixed solution of IN hydrochloric acid-2-butanol (mol ratio of $H_2O/(In+Sn)$ is 1) was prepared so that concentration of solid oxide was 2.5 weight % when added to the mixed solution of alkoxide. After adding acetyl acetone equimolar to indium alkoxide and tin alkoxide to the mixed solution, the mixed solution of IN hydrochloric acid-2-butanol was added to the mixed solution of alkoxide at room temperature. A homogeneous solution was obtained when concentration of the solid oxide was not higher than 2.5 weight %, but a partial opaqueness was found when the concentration was not lower than 3 weight %. The obtained sol was formed into a film in the same manner as Examples 27 to 40.

As is explicit from the mentioned results, in the production method according to the second invention, it is possible to obtain a homogeneous sol in which concentration of $In_2O_3$—$SnO_2$ was not lower than 10 weight % without adding any organic substance such as multidentate compound. On the contrary, in the conventional method, it is certainly possible to prepare a partially stable sol by adding a multidentate compound, but concentration of oxide thereof is low.

Further, as is understood from the results shown in Table 5, there is a tendency that film thickness of the $In_2O_3$—$SnO_2$ thin film produced by the method of Examples 27 to 42 according to the second invention is large, sheet resistance is small, and specific resistance value is small, as compared with those of Comparative Examples 4 and 5. This is, perhaps, because in the film produced according to the second invention, residual organic component is small, and accordingly defect such as pores in the internal part of the film is reduced.

Figure 2:
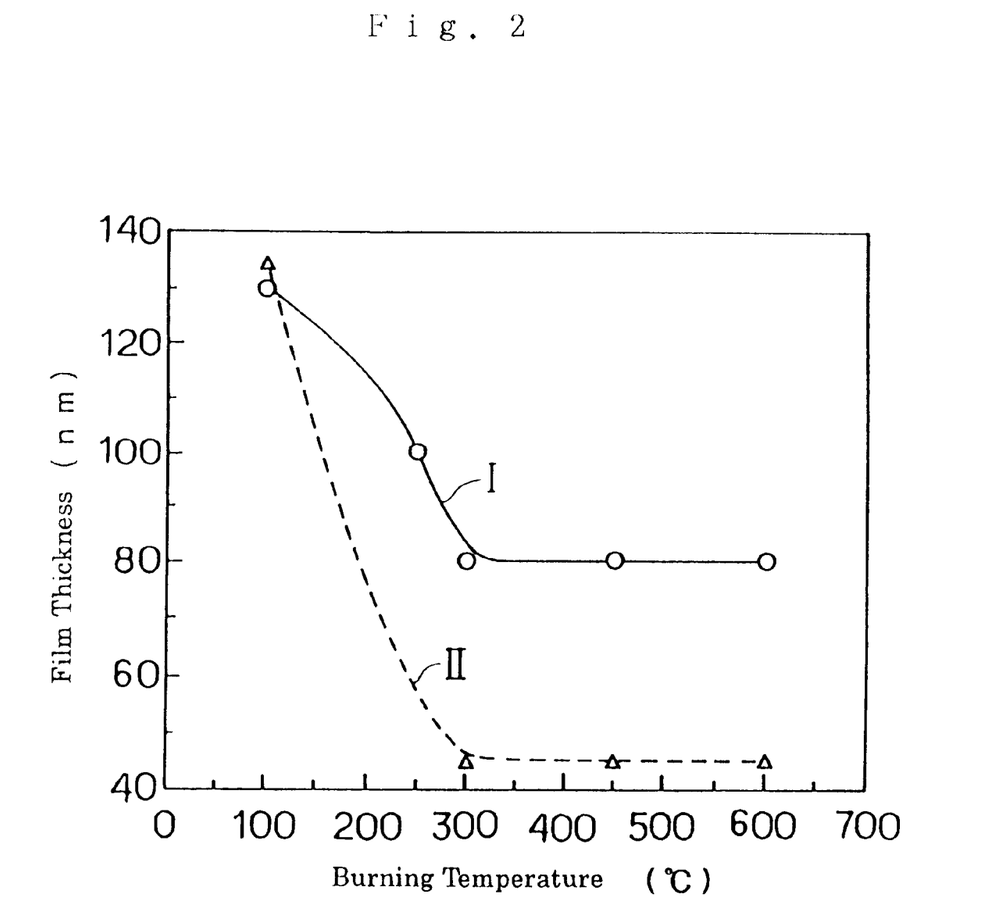
FIG. 2 is a graph showing a relation between burning temperature of the thin film of $In_2O_3$—$SnO_2$ gel obtained by forming a film of $In_2O_3$—$SnO_2$ precursor sol and film thickness of $In_2O_3$—$SnO_2$ thin film.

Further, with respect to the $In_2O_3$—$SnO_2$ precursor sol obtained in Example 34, variation in film thickness of the $In_2O_3$—$SnO_2$ thin film in association with the change in burning temperature was inspected when the thin film of $In_2O_3$—$SnO_2$ gel obtained by forming the film in the same manner as mentioned above was burned at various temperatures. Further, from the viewpoint of comparison, with respect to the $In_2O_3$—$SnO_2$ precursor sol obtained i n Comparative Example 5, a relation between burning temperature of the thin film thickness of $In_2O_3$—$SnO_2$ gel and the film thickness of the obtained $In_2O_3$—$SnO_2$ thin film was inspected. FIG. 2 shows the results. In FIG. 2, a curve I indicates the result of the thin film of $In_2O_3$—$SnO_2$ gel obtained by forming the $In_2O_3$—$SnO_2$ precursor sol obtained in Example 34 into the film, and another curve II indicates the result of the thin film of $In_2O_3$—$SnO_2$ gel obtained by forming the $In_2O_3$—$SnO_2$ precursor sol obtained in Comparative Example 5 into the film.

As shown in FIG. 2, it was acknowledged that in the thin film of $In_2O_3$—$SnO_2$ gel obtained by forming the $In_2O_3$—$SnO_2$ precursor sol obtained in Example 34 into the film, ratio of shrinkage due to the burning was about 40%, while in the thin film of $In_2O_3$—$SnO_2$ gel obtained by forming the $In_2O_3$—$SnO_2$ precursor sol obtained in Comparative Example 5 into the film, ratio of shrinkage due to the burning mounted to about 65%. Accordingly, it is understood that if the thickness of the thin film of $In_2O_3$—$SnO_2$ gel is equal, film thickness of the $In_2O_3$—$SnO_2$ thin film obtained by the method according to the second invention is large as compared with the $In_2O_3$—$SnO_2$ thin film obtained by the conventional method.

Further, the $In_2O_3$—$SnO_2$ precursor sol obtained in Example 34 was diluted so that concentration of oxide is 5 weight %, and the diluted sol is formed into a film by dip coating, and the same evaluation as mentioned above was performed. By burning the obtained thin film of $In_2O_3$—$SnO_2$ gel at a temperature of 400° C., an $In_2O_3$—$SnO_2$ thin film of 85 nm in film thickness and $2.6\times10^3$ $\Omega/\square$ in sheet resistance was obtained. The $In_2O_3$—$SnO_2$ precursor sol obtained in Example 34 was also diluted so that concentration of oxide is 1 weight %, and the diluted sol is formed into a film by flow coating on a glass substrate of 50 mm square, whereby a thin film of homogeneous $In_2O_3$—$SnO_2$ gel was obtained without problem. By burning the obtained thin film of $In_2O_3$—$SnO_2$ gel at a temperature of 400° C., an $In_2O_3$—$SnO_2$ thin film of 65 nm in film thickness and $3.6\times10^3$ $\Omega/\square$ in sheet resistance was obtained.

<Crystallization by Irradiation with Ultraviolet Beam>

EXAMPLE 43

Figure 3:
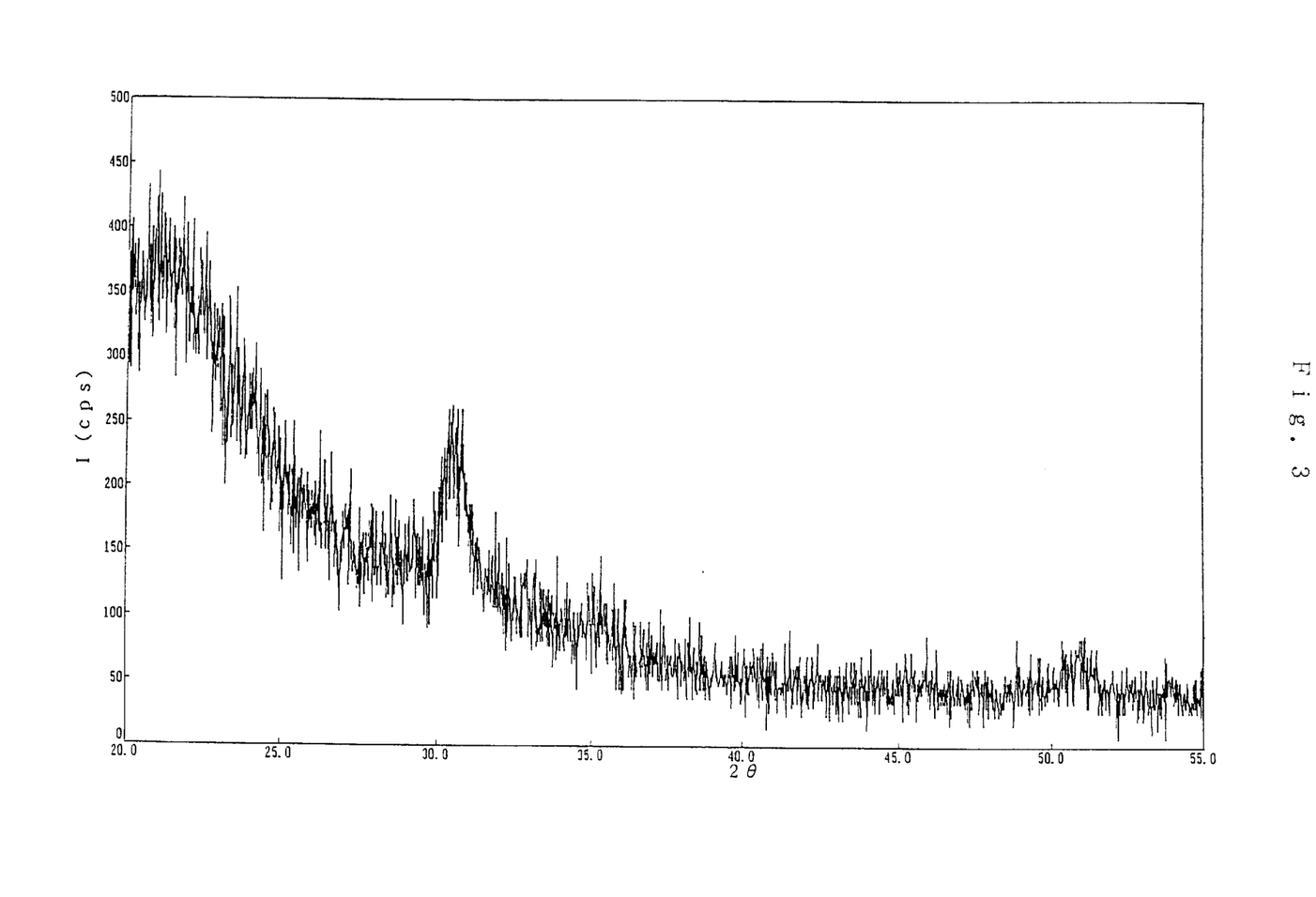
FIG. 3 shows a thin film X ray diffraction pattern of the $In_2O_3$—$SnO_2$ thin film obtained by irradiating the thin film of $In_2O_3$—$SnO_2$ gel obtained by forming a film of $In_2O_3$—$SnO_2$ precursor sol with ArF excimer laser beam.

Using the $In_2O_3$—$SnO_2$ precursor sol of the foregoing Example 1 and spin coating this sol at a revolution of 1,000 rpm, a film was formed on a silica substrate. The obtained thin film of $In_2O_3$—$SnO_2$ gel was irradiated with ArF excimer laser beam (193 nm, 20 mJ/cm$^2$) by 100 shots. As a result, a crystallization of $In_2O_3$—$SnO_2$ phase was acknowledged by thin film X ray diffraction as shown in FIG. 3. This thin film X ray diffraction pattern was the same pattern as the X ray diffraction pattern of the $In_2O_3$—$SnO_2$ thin film obtained by heating and shown in FIG. 1, and therefore in the method according to the third invention, it is possible to produce a crystalline conductive $In_2O_3$—$SnO_2$ thin film at room temperature without heat treatment. In the obtained crystalline $In_2O_3$—$SnO_2$ thin film, specific resistance was $4.6\times10^{-3}$ $\Omega$cm and transmittance with respect to a light of 520 nm in wave length was 90%.

EXAMPLE 44

Using the $In_2O_3$—$SnO_2$ precursor sol of the foregoing Example 31 and spin coating this sol at a revolution of 1,000 rpm, a film was formed on a silica substrate. The obtained thin film of $In_2O_3$—$SnO_2$ gel was irradiated with ArF excimer laser beam (193 nm, 20 mJ/cm$^2$) by 100 shots. As a result, a crystallization of $In_2O_3$—$SnO_2$ phase was acknowledged by thin film X ray diffraction. In the obtained crystalline $In_2O_3$—$SnO_2$ thin film, specific resistance was $3\times10^{-3}$ $\Omega$cm and transmittance with respect to a light of 520 nm in wave length was 90%.

EXAMPLE 45

Using the $In_2O_3$—$SnO_2$ precursor sol of the foregoing Example 31, a film was formed on a PET (polyethyleneterephthalate) substrate, and the obtained thin film of $In_2O_3$—$SnO_2$ gel was irradiated with ArF excimer laser beam on the same conditions as the foregoing Example 44. As a result, a diffraction peak corresponding to (222) side of $In_2O_3$—$SnO_2$ was observed and crystallization of $In_2O_3$—$SnO_2$ phase was acknowledged. Sheet resistance value of the obtained $In_2O_3$—$SnO_2$ thin film was $1.2\times10^4$ $\Omega/\square$.

As described above, in all of the thin films of $In_2O_3$—$SnO_2$ gel obtained by using the $In_2O_3$—$SnO_2$ precursor sol prepared in Examples 1 to 42, the $In_2O_3$—$SnO_2$ phase was crystallized by irradiation with ArF excimer laser beam, and a conductivity was manifested. Further, it became also possible to form a crystalline conductive $In_2O_3$—$SnO_2$ thin film on the plastic substrate of low heat resistance such as PET.

<Crystallization by Irradiation with Ultraviolet Beam and by Irradiation with Laser Beam>

EXAMPLE 46

The thin film of $In_2O_3$—$SnO_2$ gel obtained in the foregoing Example 43 was irradiated with an ultraviolet beam (254 nm, 10 mJ/cm$^3$) at a position separated by 3 cm from the light source using a low pressure mercury lamp of 110 W for 3 hours.

Figure 4:
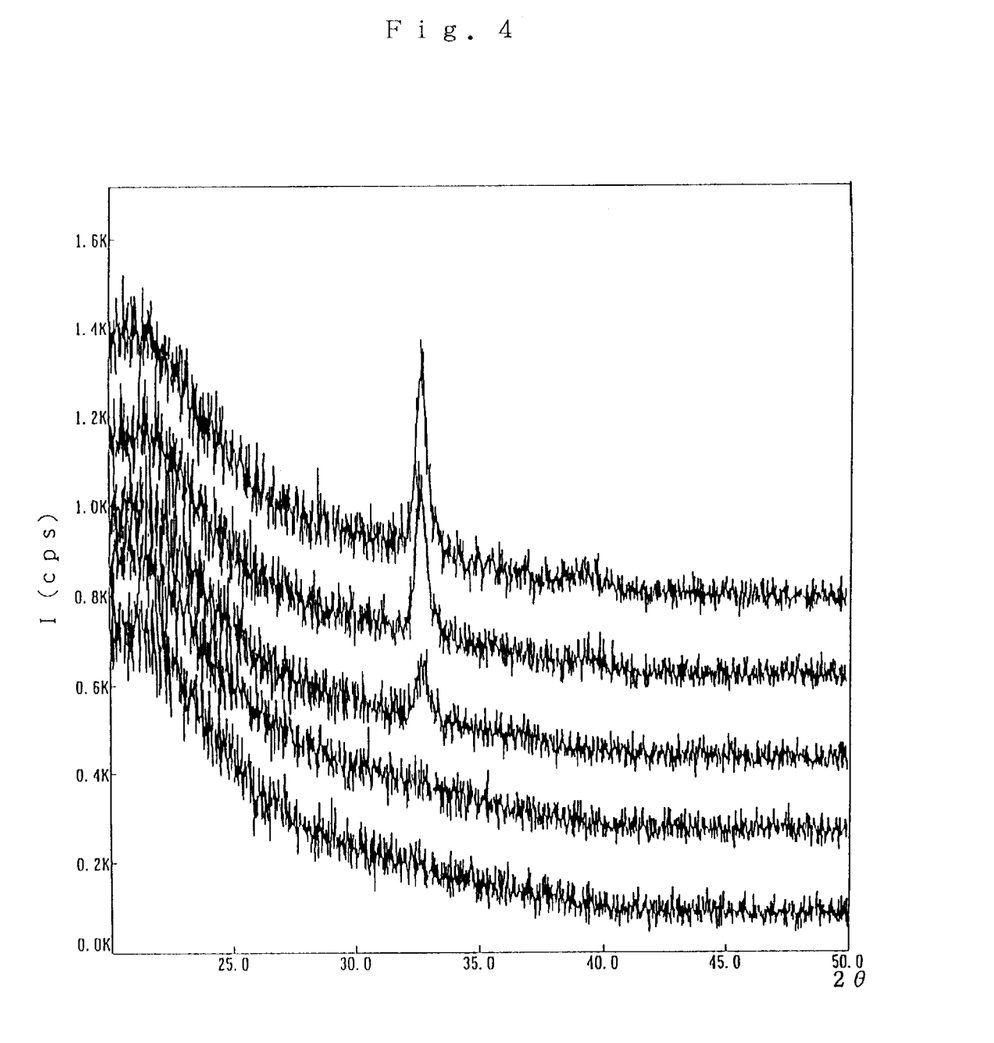
FIG. 4 shows a thin film X ray diffraction pattern of the metal dispersed gel film obtained by irradiating the thin film of $In_2O_3$—$SnO_2$ gel obtained by forming a film of $In_2O_3$—$SnO_2$ precursor sol with ultraviolet beam using a low pressure mercury lamp.

By the irradiation with the ultraviolet beam, the thin film of In$_2$O$_3$—SnO$_2$ gel on the silica glass substrate was blackened, and transmittance of the gel film with respect to the light of 550 nm in wave length was 32%. In the obtained gel film, a production of metallic indium and metallic tin was acknowledged by thin film X ray diffraction. In FIG. 4, other than the diffraction pattern of (the thin film of In$_2$O$_3$—SnO$_2$ gel) by the irradiation for 3 hours with the ultraviolet beam using the low pressure mercury lamp, those of the irradiation for 0 hour, 1 hour, 6 hours and 12 hours are also shown. In the drawing, the thin film X ray diffraction patterns of the gel films irradiated for 0 hour, 1 hour, 3 hours, 6 hours and 12 hours are respectively shown from the bottom in order. Further, as a result of observation by transmission type electron microscope (TEM), grain size of the metallic indium seen as a high brightness portion was 10 nm to 20 nm.

Further, the obtained metal dispersed gel film was irradiated with an ArF excimer laser beam (266 nm, 10 mJ/cm$^3$) by 200 shots, whereby a crystalline In$_2$O$_3$—SnO$_2$ thin film was obtained in the same manner as the foregoing Example 43. In the obtained crystalline In$_2$O$_3$—SnO$_2$ thin film, specific resistance was 4.1×10$^{-3}$ Ωcm and transmittance with respect to a light of 520 nm in wave length was 95%.

EXAMPLE 47

The metal dispersed gel film obtained in the foregoing Example 46 was irradiated with a KrF excimer laser beam (248 nm, 35 mJ/cm$^3$) by 100 shots, whereby a crystalline In$_2$O$_3$—SnO$_2$ thin film was obtained in the same manner as the foregoing Example 43. In the obtained crystalline In$_2$O$_3$—SnO$_2$ thin film, specific resistance was 4.2×10$^{-3}$ Ωcm and transmittance with respect to a light of 520 nm in wave length was 95%.

EXAMPLE 48

The metal dispersed gel film obtained in the foregoing Example 46 was irradiated with quadruple wave (266 nm) of YAG laser (266 nm, 10 mJ/cm$^3$) by 100 shots. As a result, a diffraction peak corresponding to (222) side of In$_2$O$_3$—SnO$_2$ was observed and crystallization of In$_2$O$_3$—SnO$_2$ phase was acknowledged. Conductivity was also acknowledged in the obtained In$_2$O$_3$—SnO$_2$ thin film.

EXAMPLE 49

The thin film of In$_2$O$_3$—SnO$_2$ gel obtained in the foregoing Example 44 was irradiated with an ultraviolet beam for three hours using a low pressure mercury lamp on the same conditions as Example 46. By the irradiation with the ultraviolet beam, the thin film of In$_2$O$_3$—SnO$_2$ gel on the silica glass substrate was blackened, and a gel film in which grains of metallic indium and metallic tin are dispersed was obtained.

The obtained metal dispersed gel film was irradiated with an ArF excimer laser beam (248 nm, 35 mJ/cm$^3$) by 100 shots, whereby a crystalline In$_2$O$_3$—SnO$_2$ thin film was obtained in the same manner as the foregoing Example 44. In the obtained crystalline In$_2$O$_3$—SnO$_2$ thin film, specific resistance was 2.1 ×10$^{-3}$ Ωcm and transmittance with respect to a light of 520 nm in wave length was 95%.

EXAMPLE 50

The metal dispersed gel film obtained in the foregoing Example 49 was irradiated with a KrF excimer laser beam (248 nm, 35 mJ/cm$^3$) by 100 shots, whereby a crystalline In$_2$O$_3$—SnO$_2$ thin film was obtained in the same manner as the foregoing Example 44. In the obtained crystalline In$_2$O3—SnO$_2$ thin film, specific resistance was 2.2×10$^{-3}$ Ωcm and transmittance with respect to a light of 520 nm in wave length was 95%.

EXAMPLE 51

The metal dispersed gel film obtained in the foregoing Example 49 was irradiated with quadruple wave (266 nm) of YAG laser (266 nm, 10 mJ/cm$^3$) by 100 shots. As a result, a diffraction peak corresponding to (222) side of In$_2$O$_3$—SnO$_2$ was observed and crystallization of In$_2$O$_3$—SnO$_2$ phase was acknowledged. Conductivity was also acknowledged in the obtained In$_2$O$_3$—SnO$_2$ thin film.

As described in Examples 46 to 51, by performing a pretreatment using a low pressure mercury lamp, a conductive In$_2$O$_3$—SnO$_2$ thin film of satisfactory transmittance as compared with the In$_2$O$_3$—SnO$_2$ thin film obtained in Examples 43 to 45 was obtained.

EXAMPLE 52

Figure 5:
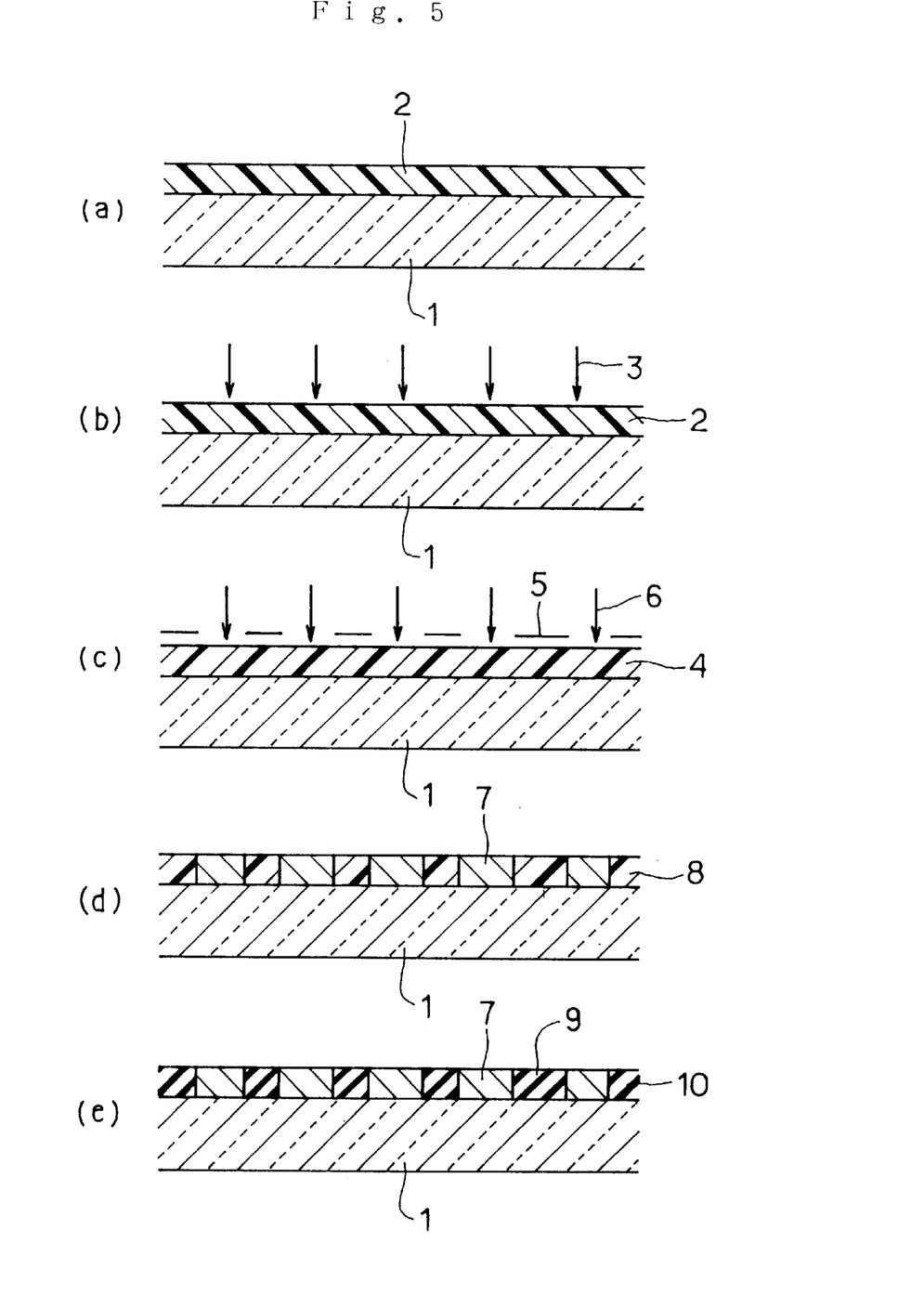
FIG. 5 is a partially enlarged longitudinal sectional view to explain an example to which the fourth invention is applied.

After forming a thin film 2 of In$_2$O$_3$—SnO$_2$ gel on a silica glass substrate according to the operation in the foregoing Example 43 as shown in the partially enlarged longitudinal sectional view of FIG. 5(*a*), the thin film 2 of In$_2$O$_3$—SnO$_2$ gel was irradiated with an ultraviolet beam 3 as shown in FIG. 5(*b*), and an obtained metal dispersed gel film 4 was irradiated an ArF excimer laser beam 6 through a photomask 5 for patterning as shown in FIG. 5(*c*). As a result, as shown in FIG. 5(*d*), only a portion 7 irradiated with the laser beam 6 became transparent, thus a thin film 9 in which conductive In$_2$O$_3$—SnO$_2$ was patterned was obtained. Further, by heat treating the thin film 8 at a temperature of 180° C. for 24 hours, a thin film 10 in which a portion 9 not irradiated with the laser beam was also transparent was obtained. However, any conductivity was not manifested in the portion 9 of the thin film 10 not irradiated with the laser beam.

Figure 6:
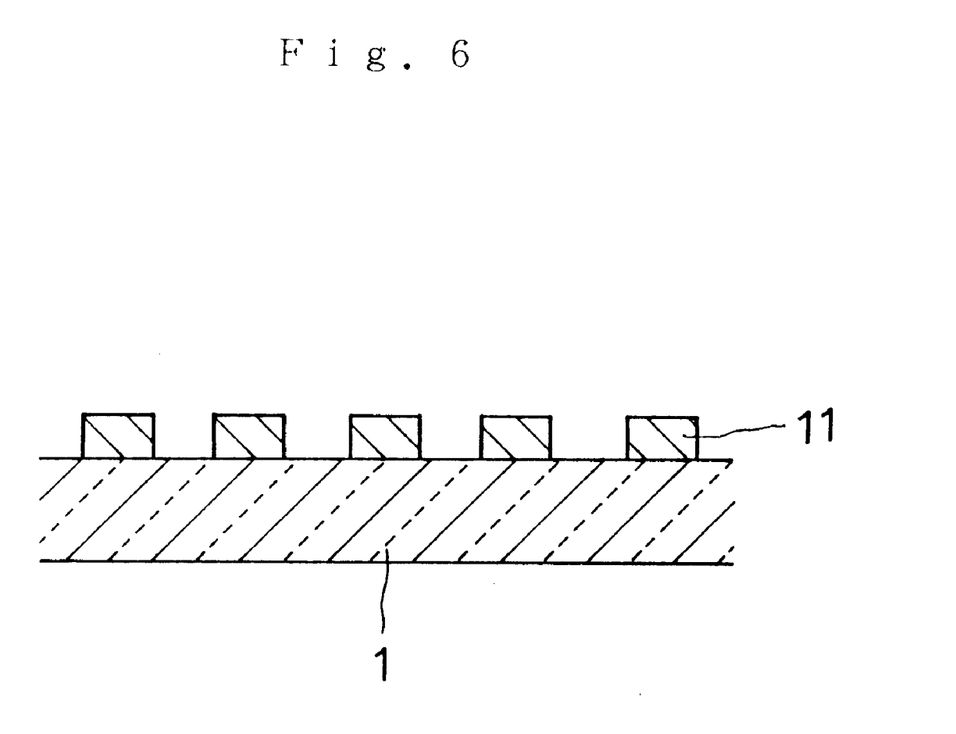
FIG. 6 is a partially enlarged longitudinal sectional view showing the conventional patterning of $In_2O_3$—$SnO_2$ according to the prior art.

In the conventional method for forming the In$_2$O$_3$—SnO$_2$ thin film, as shown in the partially enlarged longitudinal sectional view of FIG. 6, only the patterning of In$_2$O$_3$—SnO$_2$ 11 having steps on the silica glass substrate 1 can be performed. On the contrary, when applying the method according to the fourth invention, a patterning of In$_2$O$_3$—SnO$_2$ having no step became possible as shown in FIG. 5(*e*).

The patterning method described in this Example 52 was proved applicable to all of the In$_2$O$_3$—SnO$_2$ precursor sol obtained in the foregoing Examples 1 to 42. Though the metal dispersed gel film 4 was irradiated with the ArF excimer laser beam 6 in Example 52, the patterning method shown in Example 52 was found applicable also when irradiated with KrF excimer laser or quadruple wave of YAG laser.

In addition, the metal dispersed gel films obtained in Examples 46 and 49 can be utilized as black mask, etc.

INDUSTRIAL APPLICABILITY

THE PRODUCTION METHOD OF In$_2$O$_3$—SnO$_2$ precursor sol according to the present invention is applied to the formation of transparent conductive thin film on the surface of a substrate of glass, ceramics, plastics, etc. and, in particular, in the invention, a transparent conductive thin film can be formed also on the surface of a plastic substrate of less heat resistance.

What is claimed is:

1. A method for producing an $In_2O_3$—$SnO_2$ precursor sol by hydrolyzing and polymerizing a solution containing indium alkoxide and tin alkoxide, characterized in that water is added to the solution containing indium alkoxide and tin alkoxide at a temperature of not higher than −20° C.

2. A method for producing an $In_2O_3$—$SnO_2$ precursor sol according to claim 1, wherein the solution containing indium alkoxide and tin alkoxide is hydrolyzed and polymerized without using any multidentate compound.

3. A method for producing an $In_2O_3$—$SnO_2$ precursor sol according to claim 1, wherein the addition of water to the solution containing indium alkoxide and tin alkoxide is performed within the temperature range of −50° C. to −80° C.

* * * * *